United States Patent [19]
Charney et al.

[11] Patent Number: 5,809,566
[45] Date of Patent: Sep. 15, 1998

[54] AUTOMATIC CACHE PREFETCH TIMING WITH DYNAMIC TRIGGER MIGRATION

[75] Inventors: Mark Jay Charney, Millwood; Pradeep Kumar Dubey, White Plains, both of N.Y.; Thomas Robert Puzak, Ridgefield, Conn.; William John Starke, Austin, Tex.

[73] Assignee: International Business Machines Corporation, Armonk, N.Y.

[21] Appl. No.: 702,407

[22] Filed: Aug. 14, 1996

[51] Int. Cl.⁶ ........................................ G06F 9/38
[52] U.S. Cl. .......................... 711/213; 711/204; 395/584
[58] Field of Search .................. 711/213, 204, 711/118; 395/582, 585, 587, 383, 584

[56] References Cited

U.S. PATENT DOCUMENTS

| | | | |
|---|---|---|---|
| 4,200,927 | 4/1980 | Hughes et al. | 395/582 |
| 4,716,586 | 12/1987 | Bauer | 380/3 |
| 4,807,110 | 2/1989 | Pomerene et al. | 711/213 |
| 5,276,882 | 1/1994 | Emma et al. | 395/587 |
| 5,450,586 | 9/1995 | Kuzara et al. | 395/704 |
| 5,507,028 | 4/1996 | Liu | 395/383 |
| 5,623,615 | 4/1997 | Salem et al. | 395/585 |
| 5,644,759 | 7/1997 | Lucas et al. | 395/587 |

OTHER PUBLICATIONS

John W. C. Fu, "Data Prefetching Strategies for Vector Cache Memories", *IEEE*, pp. 555–560, 1991.

John W. C. Fu, "Stride Directed Prefectthing in Scalar Processors", *IEEE*, pp. 102–110, 1992.

Subbarao Palacharla, "Evaluating Stream Buffers as a Secondary Cache Replacement", *IEEE*, pp. 24–33,.

Keith I. Farkas, "How Useful Are Non–blocking Loads, Stream Buffers, and Speculative Execution in Multiple Issue Processors?", *Digital Western Research Laboratory*, Dec. 1994.

*Primary Examiner*—Tod R. Swann
*Assistant Examiner*—J. Peikari
*Attorney, Agent, or Firm*—Ratner & Prestia

[57] ABSTRACT

Dynamic migration of a cache prefetch request is performed. A prefetch candidate table maintains at least one prefetch candidate which may be executed as a prefetch request. The prefetch candidate includes one or more trigger addresses which correspond to locations in the instruction stream where the prefetch candidate is to be executed as a prefetch request. A jump history table maintains a record of target addresses of program branches which have been executed. The trigger addresses in the prefetch candidate are defined by the target addresses of recently executed program branches maintained in the jump history table. A pending prefetch table maintains a record of executed prefetch requests. When an operation such as a cache miss, cache hit, touch instruction or program branch is identified, the pending prefetch table is scanned to determine whether a prefetch request has been executed. If a prefetch request has been executed, the prefetch candidate which was used to execute that prefetch request is updated. That is, a new trigger address in the prefetch candidate is selected in order to reduce access latency.

27 Claims, 13 Drawing Sheets

| Primary Trigger Address | Valid | Active | Prefetch Information | | | Alternative Trigger Address | Valid | Active | Alternative Trigger Address | Valid | Active | ... |
|---|---|---|---|---|---|---|---|---|---|---|---|---|
| | | | Last Address | Valid | Last Offset | Offset Stable | | | | | | |
| 665 | 605 | 610 | 615 | 620 | 625 | 630 | 635 | 640 | 645 | 650 | 655 | 660 |

Extended Prefetch Candidate Table

For Multiple Levels of Touch-Hoisting

AUTOMATIC CACHE PREFETCH TIMING WITH DYNAMIC TRIGGER MIGRATION

FIELD OF THE INVENTION

The present invention relates to the prefetching of data into a cache in a data processing system. In particular, a method and apparatus are disclosed for adjusting the timing of a data prefetch based upon a prefetching history.

BACKGROUND OF THE INVENTION

Data is typically moved within the memory hierarchy of a data processing system. At the top of this hierarchy is the processor, which is connected to one or more caches. One type cache is a high-speed buffer for holding data that is likely to be used by the registers and functional units of a processor. Another type of cache is an instruction cache for holding instructions that can be provided to the processor with minimal delay. Placing a set of instructions or data values in the cache as a cache entry is useful if the processor accesses the cache entry again before the cache entry is displaced by another entry.

Either type of cache can be connected to either other caches or to the main memory of the memory hierarchy. When a program is executed, the processor fetches instructions of a program from main memory (or from an instruction cache) and executes those instructions. The execution of those instructions can cause the processor to request a cache entry or to modify or overwrite the cache entry and portions of main memory of the memory hierarchy.

An exemplary data processing system 100 in accordance with the prior art is shown in FIG. 1. The data processing system 100 has a cache which may consist of only a single cache unit or multiple cache units. The cache may be separated into a data cache 145 and an instruction cache 110 so that both instructions and data may be simultaneously provided to the data processing system 100 with minimal delay. The data processing system 100 further includes a main memory 150 in which data and instructions are stored, a memory system interface 105 which allows the instruction cache 110 and data cache 145 to communicate with main memory 150, an instruction fetch unit 115 for retrieving instructions of an executing program. Further included in the data processing system is a decode and dispatch unit 120 for interpreting instructions retrieved by the instruction fetch unit 115 and communicating the interpreted information to one or more execution units, and a plurality of execution units including a branch unit 125, functional unit 130 and memory unit 140, for using the interpreted information to carry out the instruction. The branch unit 125 is responsible for executing program branches, that is, computing modifications to the program counter as a program is executed. The generic functional unit 130 represents one or more execution units that can perform operations such as addition, subtraction, multiplication, division, shifting and floating point operations with various types of data as required in a general or special purpose computing device. The memory unit 140 is responsible for computing memory addresses specified by a decoded instruction. A register file 135 is also included in the data processing system 100 for temporarily holding data. Of course, other storage structures may be used instead of or in addition to the register file 135, such as those used for dealing with speculative execution and implementation of precise interrupts. A simple register file 135 is described as being illustrative of the storage structures which may be used.

When a program is executed, a program counter or sequence prediction mechanism communicates an instruction address to the instruction fetch 115. The instruction fetch 115, in turn, communicates the instruction address to the instruction cache 110. If the instruction corresponding to the instruction address is already in the instruction cache 110, the instruction cache returns the instruction to the instruction fetch 115. If not, the instruction cache 110 transmits the instruction address to the memory system interface 105. The memory system interface 105 locates the instruction address in main memory 150, and retrieves the instruction stored at that address. The instruction is then delivered to the instruction cache 110, from which it is finally returned to the instruction fetch 115.

When the instruction arrives at the instruction fetch 115, it is delivered to the decode and dispatch unit 120 if there is available buffer space within the decode and dispatch unit 120 for holding the instruction. The decode and dispatch unit 120 then decodes information from the delivered instruction, and proceeds to determine if each instruction and associated decoded information can be placed in the execution queue of one of the execution units. The appropriate execution unit receives the instruction and any decoded information from the decode and dispatch unit 120, and then uses the decoded information to access data values in the register file 135 to execute the instruction. After the instruction is executed, the results are written to the register file 135.

In addition to its general function of computing memory addresses, the memory unit 140 is responsible for executing three particular instructions: loads, stores and touch instructions.

A load instruction is a request that particular data be retrieved and stored in the register file 135. The memory unit 140 executes a load instruction by sending a request to the data cache 145 for particular data. If the data is in the data cache 145 and is valid, the data cache returns the data to the memory unit. If the data is not in the data cache 145 and/or invalid, the data cache 145 accesses a particular data memory address in main memory 150, as indicated by the load instruction, through the memory system interface 105. The data is returned from main memory 150 to the data cache 145, from which it is eventually returned to the memory unit 140. The memory unit 140 stores the data in the register file 135 and possibly passes it to other functional units 130 or to the branch unit 125.

A store instruction is a request that data be written to a particular memory address in main memory 150. For stores, a request is sent by the memory unit 140 to the data cache 145 specifying a data memory address and particular data to write to that data memory address. If the data corresponding to the specified data memory address is located in the data cache 145 and has the appropriate access permissions, that data will be overwritten with the particular data specified by the memory unit 140. The data cache 145 then accesses the specified memory address in main memory 150, through the memory system interface 105, and writes the data to that address.

A touch instruction is an instruction indicating that particular instructions or data will be needed by the data processing system 100 in the future. The memory unit 140 requests the data from the data cache 145. If the data is not present and/or valid in the data cache 145, it may be loaded into the data cache 145 from a particular memory address, as specified by the touch instruction, using the memory system interface 105.

Focusing on the cache, which may include a data cache 145 and instruction cache 110, the cache is repeatedly queried for the presence or absence of data during the execution of a program. Specifically, the data cache 145 is queried by the memory unit 140 regardless of whether the memory unit 140 executes a load, store or touch instruction. Similarly, the instruction cache 110 is repeatedly queried by the instruction fetch 115 for a particular instruction. When data is requested from the data cache 145, a cache "hit" occurs if that data is in the cache and valid. On the other hand, a cache "miss" occurs if requested data is absent from a cache, or if the data is in the cache but has the wrong "access permissions." Data may have the wrong access permissions if it is being read or written by another data processor in the data processing system when requested.

If a cache miss occurs, the requested data is desirably retrieved from main memory and inserted into the cache, which may displace other cached data. The delay associated with fetching data from main memory is generally much greater than if the data was already in the cache because main memory does not have the high speed access capabilities of a cache. This delay associated with memory data access is commonly referred to as "access latency" or "latency."

To improve latency, data may be "prefetched" from memory into the cache or, for example, between multiple memory levels. Prefetching refers to the transfer of data from the memory into the cache before it is needed by the processor. Prefetching is desirable because it reduces latency.

Prefetching can be carried out by hardware or software. In hardware-controlled prefetching, a prefetch is triggered by dynamic observations of cache misses. Software-controlled prefetching, on the other hand, is a technique performed by a programmer or compiler through the insertion of "touch instructions." A touch instruction is an instruction in the instruction stream of a program specifying that particular data will be needed by the processor in the near future.

Extraneous delays may affect the placement and timing of a touch instruction in the instruction stream. These delays may include delays associated with the various buffers and memory components, as well as delays caused by contention with other prefetch requests. If knowledge of the extraneous delays is not taken into account when a touch instruction is inserted into the instruction steam, a prefetch may lose its utility, even when the prefetch is otherwise well-timed.

The utility of a prefetch is determined by how much latency is reduced by the prefetch. Ideally, if the prefetch is timed perfectly, the latency is eliminated. This is the case if the data requested by the prefetch arrives immediately before that data is requested by the processor. In many cases, however, a prefetch may not be timed perfectly, but still well-timed. That is, the access latency may not be entirely eliminated, but nevertheless reduced. This is the case if the data requested by the prefetch arrives in the cache any earlier than it would have arrived if it were just fetched on demand and not prefetched. For example, if the access latency associated with an instruction is 30 processor cycles, a well-timed timed prefetch would reduce the latency to any number of processor cycles less than 30. The utility of the prefetch would increase as the latency was reduced, e.g. from 30 to 25, 20, 15 etc., and the utility would be maximized if the latency were reduced to 0 cycles.

Unfortunately, prefetch triggers often occur at inappropriate or less than optimal times. This could be caused by not having enough instructions in the instruction stream to cover the latency not eliminated by the prefetch. This mistiming decreases the utility of prefetching, because the latency of data access might not be reduced at all or only slightly reduced. At least two problems may arise due to a mistimed prefetch. In software-controlled prefetching, mistiming can limit the location, and, consequently, the effectiveness of the touch instruction. And in hardware-controlled prefetching, prefetches may be issued too late to reduce the access latency.

SUMMARY OF THE INVENTION

A method and apparatus adjusts the timing of a prefetch request to a cache. An operation associated with a prefetch request is identified. At least one trigger address corresponding to a potential prefetch is stored in a prefetch candidate table. The trigger address is selected as an active trigger address in response to execution of the identified operation.

BRIEF DESCRIPTION OF THE DRAWINGS

FIG. 6 is an illustration of an extended prefetch candidate table according to an exemplary embodiment of the present invention.

DETAILED DESCRIPTION

To reduce access latency, it may be desirable to alter the location of a prefetch in the instruction stream of a program while the program is executing. That is, it may be desirable to change the location of the prefetch so that it occurs in an earlier or later portion of the program code to effectively reduce latency. A prefetch is "hoisted" when the prefetch occurs in an earlier portion of a given region of program code than its original placement or observation. Thus, the time between when the prefetch is executed and when the corresponding data is expected by the computer program is increased. Conversely, if hoisting the execution of a prefetch proves not to be useful; that is, latency is not reduced or the data is not used after the execution of the prefetch is hoisted, it may be desirable to "unhoist" the execution of the prefetch so that the prefetch occurs in a later portion of the region of program code.

Figure 1:
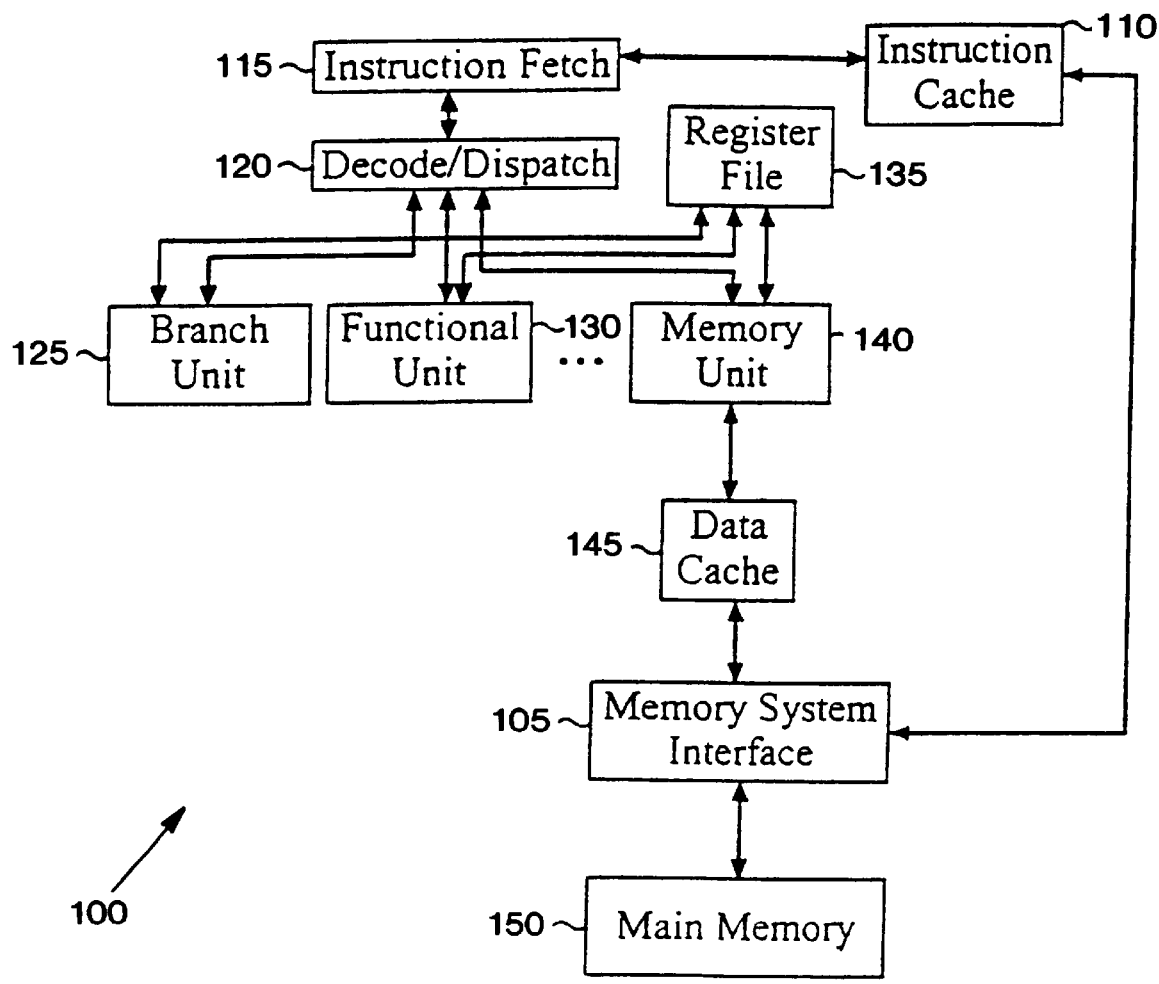
FIG. 1 is a block diagram of a data processing system according to the prior art.
Figure 2:
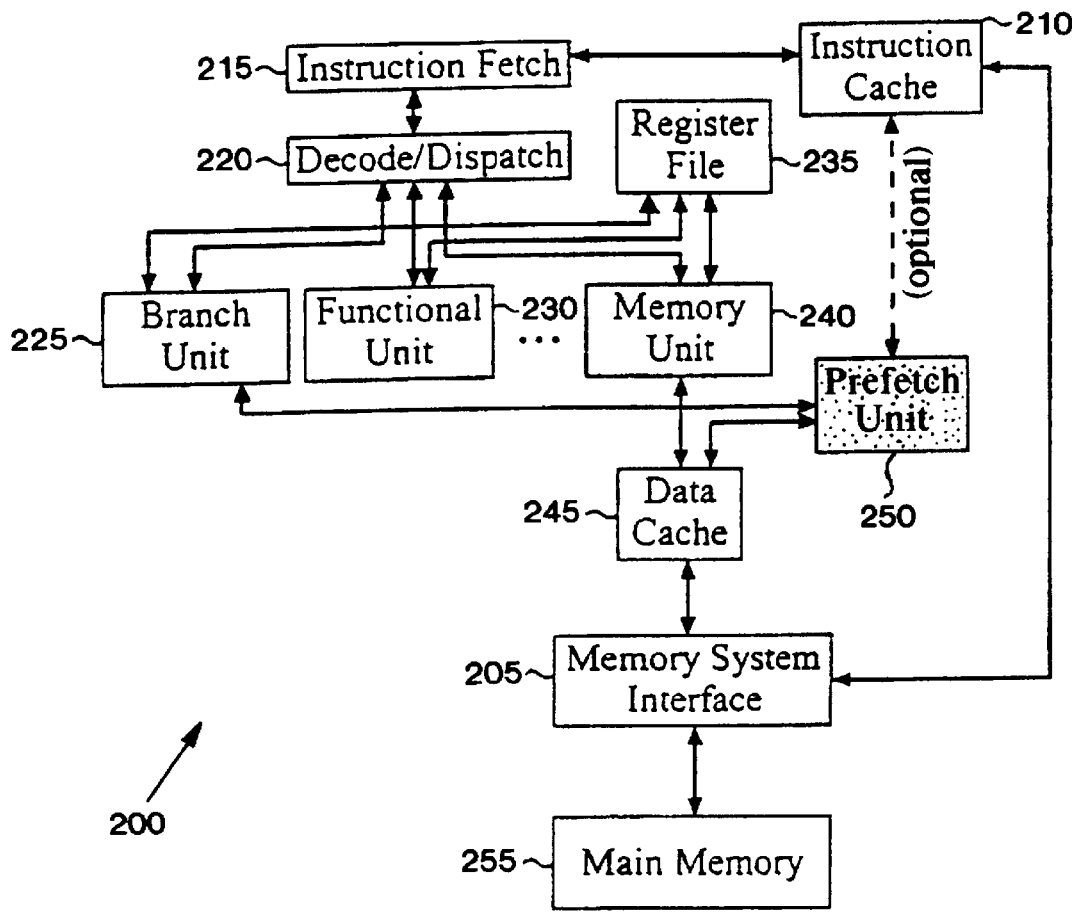
FIG. 2 is a block diagram of a data processing system according to an exemplary embodiment of the present invention.

FIG. 2 is a block diagram of a data processing system 200 according to a preferred embodiment of the present invention. Data processing system 200 shares some similarities with data processing system 100 illustrated in FIG. 1. Data processing system 200, however, differs from data processing system 100 in several important aspects.

In data processing system 200, a prefetch unit 250 according to the method and apparatus of the present invention has been added. The prefetch unit 250 communicates with the branch unit 225, data cache 245 and instruction cache 210. Functionally, the prefetch unit 250 is responsible for maintaining and executing prefetch requests in a program while it is executed. Specifically, prefetch unit 250 tracks and adjusts the "trigger address" of a prefetch request. This corresponds to the program counter value associated with a prefetch request, which defines its location in the instruction stream of the program being executed. In addition, the prefetch unit maintains the memory address of data to be prefetched. In order to identify and track a prefetch request, the prefetch unit 250 observes data reference patterns such as modifications (e.g. non-sequential incrementation) to the program counter in order to track the execution path or branch direction of a program. To this end, a program branch is communicated to the branch unit 225 from the decode and dispatch unit 220, and the branch unit computes the target address of the branch, which is then communicated to the prefetch unit 250. The prefetch unit 250 may also be notified by data cache 245 if a touch instruction is executed by memory unit 240. The prefetch unit 250 can then track the execution path or branch direction of the program to adjust the timing of the prefetch request.

In sum, the prefetch unit 250 identifies any of several operations, such as, when a load or store instruction executed by memory unit 240 causes a cache miss or cache hit, when a touch instruction is issued by memory unit 240 to the data cache 245, and when the branch unit 225 executes a program branch.

Prefetch unit 250 may have an optional connection to the instruction cache 210 in order to perform instruction cache prefetching in addition to data cache prefetching in a similar manner to that used by the data cache.

Figure 3:
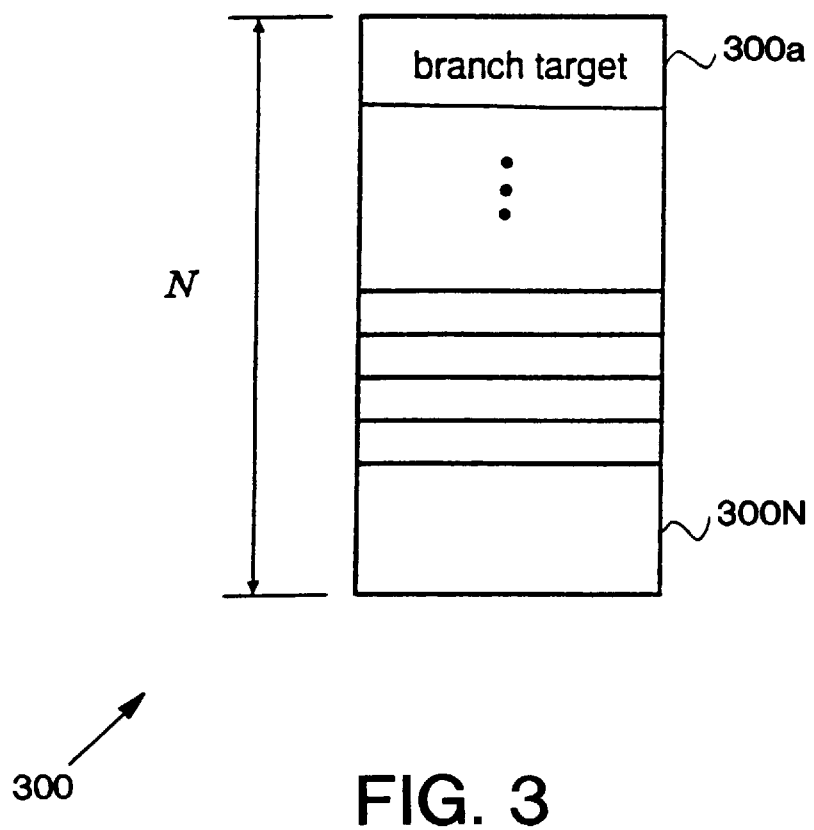
FIG. 3 is an illustration of a jump history table according to an exemplary embodiment of the present invention.

According to one exemplary embodiment of the present invention, as illustrated in FIG. 3, a jump history table (JHT) 300 may be included for maintaining a plurality of previously executed program branches. Specifically, the JHT 300 contains N target addresses 300a–300N of recently executed program branches. The JHT 300 is updated whenever a program branch occurs. That is, when a program branch is executed, the target address of that program branch is added to the N target addresses maintained in the JHT 300. According to another exemplary embodiment of the present invention, ones of the target addresses 300a–300N may include a valid bit set to "0" to indicate that the corresponding target address is invalid. Similarly, the valid bit could be set to "1" to indicate the presence of a valid target address. Other embodiments in accordance with the present invention are contemplated.

Figure 4A:
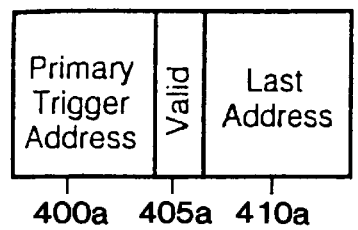
FIG. 4a, FIG. 4b and FIG. 4c illustrate prefetch candidates according to exemplary embodiments of the present invention.
Figure 4B:
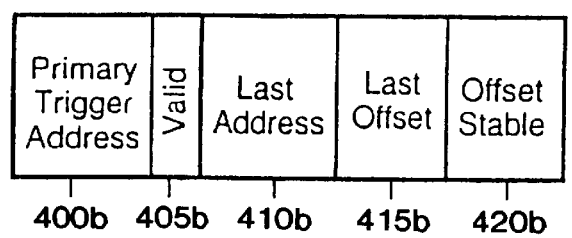

According to another exemplary embodiment of the present invention, a prefetch candidate, as illustrated in FIGS. 4a and 4b, may be included for storing a trigger address which corresponds to a potential prefetch. Specifically, FIG. 4a shows a prefetch candidate having a primary trigger address 400a. The primary trigger address 400a represents the location of the prefetch candidate in the instruction stream (i.e. the program counter value corresponding to the prefetch). When a prefetch candidate is created, The JHT 300 provides the basic block boundary address for the primary trigger address 400a. The prefetch candidate shown in FIG. 4a further includes a last address field 410a indicating a memory address of data to be prefetched. The last address field 410a may be several bits wide, the number of bits being less than or equal to the width of the memory address. A valid field 405a may also be included to indicate whether the prefetch candidate is valid.

FIG. 4b illustrates another embodiment of a prefetch candidate according to the present invention sharing some similarities with the prefetch candidate illustrated in FIG. 4a. The prefetch candidate illustrated in FIG. 4b, however, includes some additional features, namely the last offset field 415b and offset stable field 420b. The last offset field 415b and offset stable field 420b may operate to deduce stride in the instruction stream occurring at the primary trigger address. Specifically, the last offset field 415b, which may be signed and several bits wide, would represent the signed difference between the current and previous values of the last address field 410b. The offset stable field 420b would be a one-bit field, indicating whether the difference between the previous value of the last address field 410b and the current value of the last address field 410b matched the previous value of the last offset field 415b. In contrast to the prefetch candidate of FIG. 4a, in which the memory address of the data to be prefetched directly corresponds to the last address field 410a, the memory address of the data to be prefetched is determined by adding the last address field 410b to the last offset field 415b. This is more fully described in J. FU, J. Patel, and B. Janssens, "Stride Directed Prefetching in Scalar Processors," SIGMICRO Newsletter Vol. 23, p. 102–110, 1992.

Figure 4C:
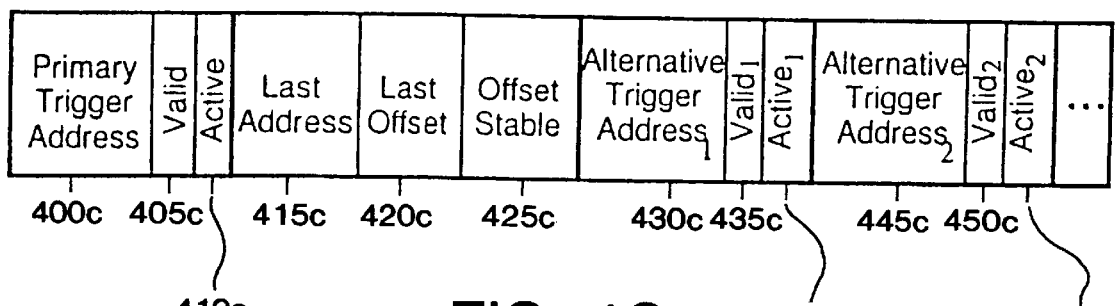

Another exemplary embodiment of a prefetch candidate according to the present invention is illustrated in FIG. 4c. This prefetch candidate is analogous to and shares some similarities with the prefetch candidates of FIGS. 4a and 4b, and it includes some additional features. One of these additional features is a plurality of alternative trigger addresses, two of which are shown in FIG. 4c as fields 430c and 445c. The primary trigger address further includes an active field 410c, and the alternative trigger addresses 430c and 445c each have respective active fields 440c, 455c and valid fields 435c, 450c. The active fields 410c, 440c, 455c denote which of the plurality of trigger addresses is to be used when a prefetch is executed. Each active field is desirably one bit wide. Specifically, a "1" in an active field indicates that the corresponding trigger address is active. Only one active field in the prefetch candidate may be a "1" at any given time. Similar to the primary trigger address 400c, the JHT 300 provides values for the plurality of alternative trigger addresses 430c, 445c when the prefetch candidate is created. In particular, successive alternative trigger addresses are made to correspond to older program branches maintained in the JHT 300.

Figure 5:
FIG. 5 is an illustration of a prefetch candidate table according to an exemplary embodiment of the present invention.

A plurality of prefetch candidates may be maintained in a prefetch candidate table (PCT) 500, as illustrated in FIG. 5. The PCT 500 of FIG. 5 incorporates a plurality of prefetch candidates similar to those described in FIG. 4b. Similarly, if alternative triggers are desired, an extended PCT 600 may be maintained, as illustrated in FIG. 6. The extended PCT 600 incorporates a plurality of prefetch candidates similar to those described in FIG. 4c.

New prefetch candidates in the PCT 500 may be created in response to cache misses and the execution of touch instructions. When a cache miss or a touch instruction occurs, the program counter value corresponding to the touch instruction or instruction that caused the cache miss is received by the PCT 500 as a primary trigger address 530 of a new prefetch candidate. According to another exemplary embodiment of the present invention, the most recent target address created in the JHT. 300 may be used as the primary trigger address 530 of a new prefetch candidate. The last address field 510 is determined by the memory address of the data requested by the touch instruction or instruction causing the cache miss.

The PCT 500 can use a least recently used (LRU) replacement algorithm which is well known in the art to make room for new prefetch candidates. According to this algorithm, the least-recently-used prefetch candidate in the PCT 500 will be removed from the PCT 500 to make room for a new prefetch candidate.

The PCT 500 is used to decide whether a prefetch candidate included therein should be launched. Specifically, after the execution of an operation such as a touch instruction or cache access which results in either a cache miss or a cache hit, the program counter value corresponding to the operation may be used to scan the PCT 500 for one or more prefetching candidates having a matching active primary trigger address 530. Similarly, for an operation such as a program branch, the target address of the program branch may be used to scan the PCT 500 for one or more prefetching candidates having a matching active primary trigger address 530. In another exemplary embodiment of the present invention, the memory address of the data requested by the touch instruction or cache miss may be used to scan the PCT 500 for a prefetch candidate having a matching last address field 510. In either embodiment, the corresponding prefetch candidate is selected for prefetching.

Similar to the PCT 500 from FIG. 5, an extended PCT 600, illustrated in FIG. 6, may also be used to decide whether a prefetch candidate included therein should be launched. Specifically, after the execution of an operation such as a touch instruction or cache access which results in a cache miss, or cache hit, the program counter value corresponding to the operation may be used to scan the PCT 600 for one or more prefetching candidates having a matching active primary trigger address 665. Similarly, for an operation such as a program branch, the target address of the program branch may be used to scan the PCT 600 for one or more prefetching candidates having a matching active primary trigger address 665. But unlike PCT 500, in which only the primary trigger address 530 of the prefetch candidates could be scanned, the primary trigger address 665 as well as the plurality of alternative trigger addresses 635 and 650 may be scanned for a matching active trigger address. In another exemplary embodiment of the present invention, the memory address of the data requested by the touch instruction or cache miss may be used to scan the PCT 600 for a prefetch candidate having a matching last address field 615. The corresponding prefetch candidate is then selected for prefetching.

New prefetch candidates in the PCT 600 are created in response to cache misses and the execution of touch instructions. When a cache miss or a touch instruction occurs, the program counter value corresponding to the touch instruction or instruction that caused the cache miss is received by the PCT 600 as a primary trigger address 665 of a new prefetch candidate. The last address field 615 is determined by the memory address of the data requested by the touch instruction or instruction causing the cache miss. And JHT 300 provides values for the plurality of alternative trigger addresses 635, 650. Successive alternative trigger addresses are made to correspond to older program branches maintained in the JHT 300.

Similar to the PCT 500, the PCT 600 can use a least recently used (LRU) replacement algorithm which is well known in the art to make room for new prefetch candidates. According to this algorithm, the least-recently-used prefetch candidate in the PCT 600 will be removed from the PCT 600 to make room for a new prefetch candidate.

Figure 7:
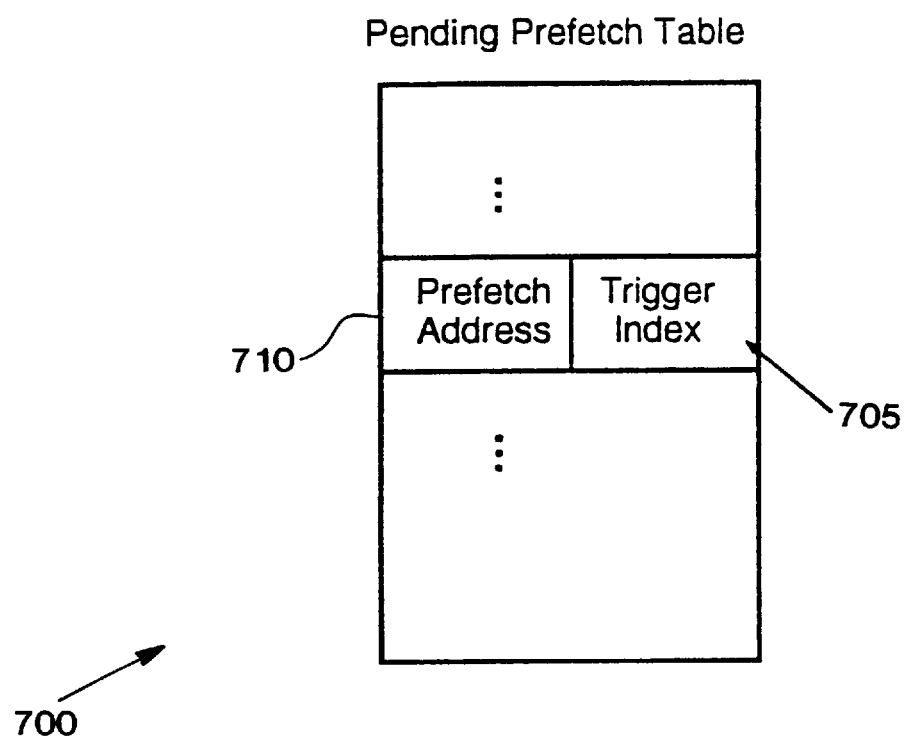
FIG. 7 is an illustration of a pending prefetch table according to an exemplary embodiment of the present invention.

A prefetch unit according to an exemplary embodiment of the present invention further includes a pending prefetch table (PPT) 700, as illustrated in FIG. 7. The PPT 700 maintains a plurality of pending prefetches. Each pending prefetch is a separate data record which is maintained in the PPT 700. A new pending prefetch is created in the PPT 700 when a prefetch requests data from the memory. The memory address of the prefetched data is stored in the prefetch address field 710 of the newly created pending prefetch request. The trigger address field 705 of the newly created prefetch is made to point to the prefetch candidate in the PCT 600 which corresponds to the recently executed prefetch. The PPT 700 behaves like a shift register having the ability to delete specific entries. In particular, a pending prefetch stored in the PPT 700 may be specifically removed, or, if not removed, it will be eventually shifted out over time. A pending prefetch may be shifted out of the PPT 700 if, for example, a prefetch is erroneous, i.e. data is requested one time from memory but was subsequently not needed.

If a pending prefetch is shifted out, this is an indication that the prefetched data has proved not to be useful. If a prefetch has proved to be useful, then the corresponding pending prefetch is explicitly removed from the PPT before it would be shifted out. This mechanism is described in more detail below.

Figure 8:
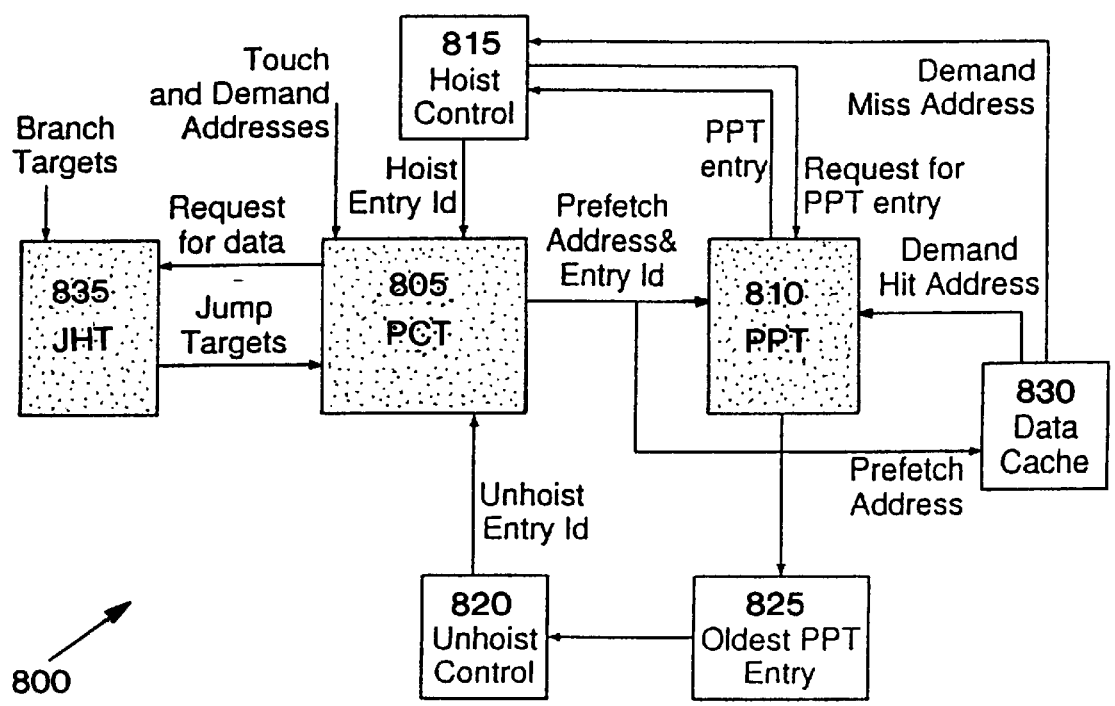
FIG. 8 is a block diagram illustrating the relationship between a jump history table, prefetch candidate table and pending prefetch table according to an exemplary embodiment of the present invention.

One exemplary embodiment of the prefetch unit is illustrated in FIG. 8. A JHT 835 is provided which is coupled to a PCT 805. The PCT 805 is coupled to a PPT 810, both of which being coupled to a data cache 830. A hoist control 815 for "hoisting" prefetch candidates in the PCT 805 is coupled to the PCT 805, PPT 810 and data cache 830. A prefetch is "hoisted" when the prefetch occurs in an earlier portion of a given region of program code so that the time between when the prefetch is executed and when the corresponding data is expected by the computer program is increased. Conversely, if a hoisted prefetch proves not to be useful; that is, latency is not reduced after the prefetch is hoisted or the data is not used, it may be desirable to "unhoist" the prefetch so that the prefetch occurs in a later portion of the region of program code. To this end, an oldest PPT entry 825 is coupled to the PPT 810 and unhoist control 820. The unhoist control 820 is coupled to the PCT 805.

The method of operation according to an exemplary embodiment of the present invention will now be discussed.

Figure 9:
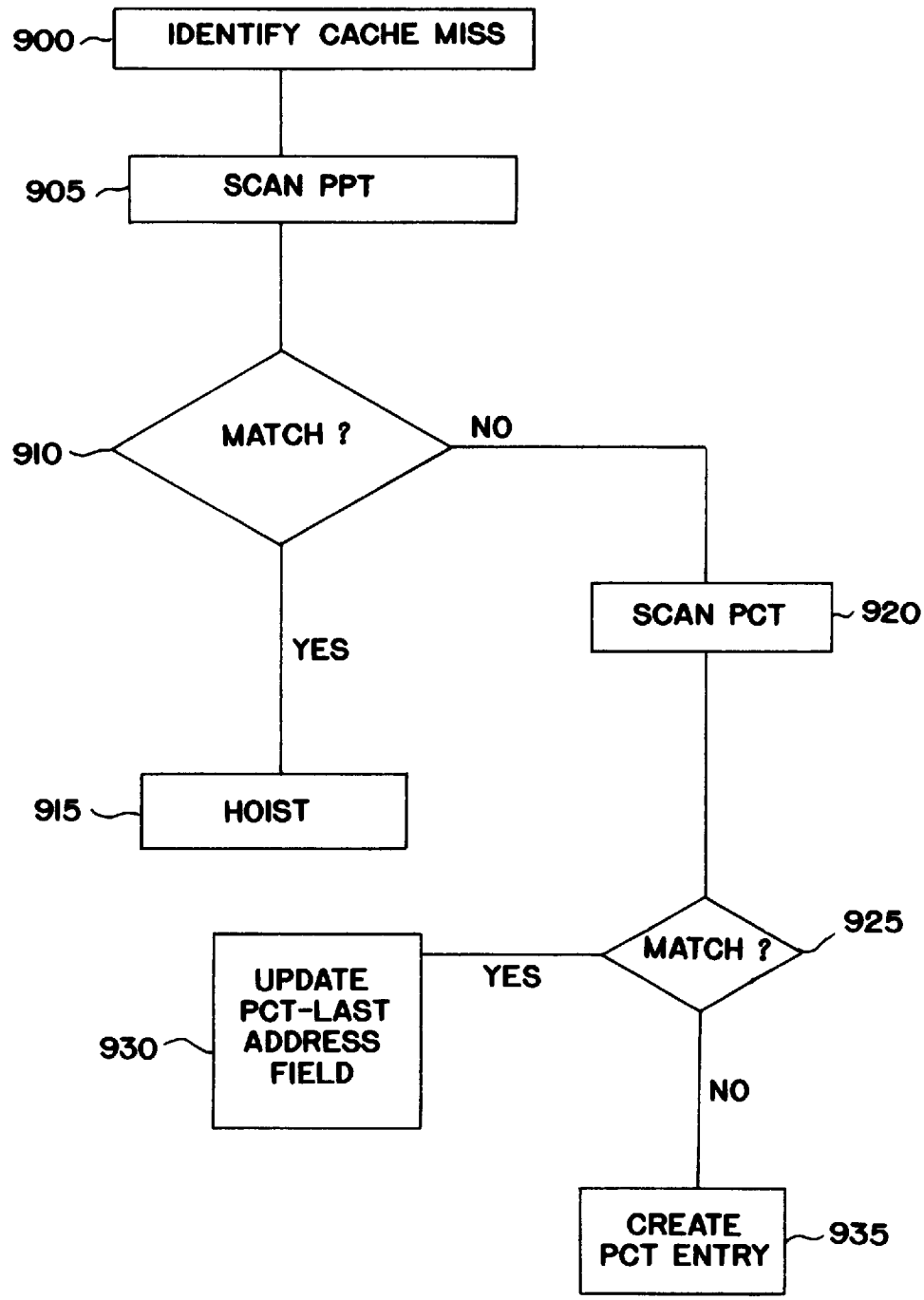
FIG. 9 is a flowchart diagram illustrating the processing of a cache miss according to an exemplary embodiment of the present invention.

The method of responding to a cache miss, according to an exemplary embodiment of the present invention, is illustrated in FIG. 9. At step 900, a cache miss is identified by the prefetch unit. Referring now to the block diagram of FIG. 8, the data cache 830 signals the hoist control 815 of the cache miss and submits the memory address of the data requested to the hoist control 815. The hoist control 815 uses the memory address of the data requested to scan the PPT 810 for a pending prefetch having a prefetch address 710 which corresponds to the memory address of the data requested in order to determine whether a prefetch was executed, illustrated at step 905 in FIG. 9. At step 910, if a prefetch had been previously executed, that is, if a pending prefetch in the PPT 810 corresponds to the memory address of the data requested when the cache miss occurred, then, at step 915, the prefetch candidate corresponding to the pending prefetch is hoisted (if possible) to attempt to reduce the latency of the cache miss. The trigger index 705 of the pending prefetch is transmitted to the hoist control 815. The hoist control 815 uses the trigger index 705 to locate any corresponding prefetch candidate(s) in the PCT 805.

If any corresponding prefetch candidates are located in the PCT 805, they are hoisted. Specifically, a new one of the plurality of trigger addresses included within a prefetch candidate located by the hoist control 815 is selected as an active trigger address. The selection of a new active trigger address depends on which trigger address is already active, that is, which trigger address has an associated active field already set to "1." To hoist a prefetch candidate if the primary trigger address is already active, the active field of the primary trigger address is set to "0," and the active field of the first of the plurality of alternative trigger addresses is set to "1." To hoist a prefetch candidate if a particular alternative trigger address (other than the last alternative trigger address) in the PCT 805 is active, then trigger address is set to inactive and the next alternative trigger address is set to active. If the last alternative trigger address is active, there can be no further hoisting of this prefetch candidate. Because successive alternative trigger addresses correspond to older program branches stored by the JHT 835, making successive alternative trigger addresses active corresponds to using the older program branches to hopefully trigger the prefetches earlier to reduce the latency of the cache miss the next time the program region which requested the data is executed.

At step 910, if no match is found in the PPT 810, the program counter value of the instruction that caused the cache miss is used to scan the PCT 805 for a prefetch candidate having a matching and valid primary trigger address in step 925 of FIG. 9. Alternatively, the memory address of the requested data could be used to scan the PCT 805 for a prefetch candidate having a matching last address field 510. If a matching prefetch candidate is found, the last address field 510 (and last offset 520 and offset stable 525, if stride information is being kept) are updated. Specifically, if stride information is being maintained, a new value for the last offset field 520 is computed using the difference between the memory address of the data requested when the cache miss occurred and the last address field 510, and the offset stable field 525 is set to "1 " if the new value for the last offset field 520 is the same as the old value of the last offset field 520—otherwise, offset stable is set to zero. As explained above, the last offset 520, offset stable 525 and last address 510 fields are desirably updated so that the last offset field 520, when added to the last address field 510, provides the memory address of the data requested when the next prefetch is executed. If no stride information is being maintained, the memory address of the data requested when the cache miss occurred is simply copied directly to the last address field 615.

If, at step 910, no prefetch candidate having a matching valid primary trigger address is found, a new prefetch candidate is created.

Regardless of whether stride information is being kept, and/or whether alternative trigger addresses are included in a prefetch candidate, the first step in creating a new prefetch candidate is to remove the least-recently-used prefetch candidate (according to an LRU algorithm) from the PCT 805 in order to make room for the new entry. Any corresponding pending prefetches in the PPT 810 may also be removed or is otherwise disassociated.

The remaining steps of updating the prefetch candidate table depend on whether the prefetch candidates include alternative trigger addresses, and whether stride information is being kept in the PCT 805.

If no stride information or alternative trigger addresses are used, referring back to FIG. 4a, creating a new prefetch candidate involves using the program counter value of the instruction which caused the cache miss as the primary trigger address 400a of the newly created prefetch candidate. The valid bit 405a is set to "1," and the last address field 410a is set to the memory address of the data requested when the cache miss occurred.

If stride information is maintained in the PCT 805, referring back to FIG. 4b, creating a new prefetch candidate in the PCT 805 is accomplished using the program counter value of the instruction which caused the cache miss as the primary trigger address 400b of the newly created prefetch candidate. The valid bit 405b is set to "1," and the last address field 410b is set to the memory address of the data requested when the cache miss occurred. To update the stride information, the last offset field 415b is set to "0," and the offset stable field 420b is set to "0."

When stride information is maintained, and the prefetch candidates are provided with alternative trigger addresses, as illustrated by the extended prefetch candidate in FIG. 4c, creating a new prefetch candidate in the PCT 805 involves using the program counter value of the instruction which caused the cache miss as the primary trigger address 400c of the newly created prefetch candidate. The valid bit 405c for the primary trigger address is set to "1," and the active bit 410c for the primary trigger address is set to "0." The last address field 415c is set to the memory address of the data requested when the cache miss occurred. To obtain alternative trigger addresses when alternative trigger addresses are maintained, as shown in FIG. 8, the PCT 805 requests target addresses of executed program branches from the JHT 835. The target address corresponding to the most recently executed program branch maintained in the JHT 835 becomes the first alternative trigger address 430c. Similarly, the target address corresponding to the second most recently executed program branch maintained in the JHT 835 becomes the second alternative trigger address 445c, etc. The valid bits 435c, 450c for all of the alternative trigger addresses are set to "1." The active bit 440c for the first alternative trigger address 430c is set to "1," while the active fields 440c, 455c for the remaining plurality of alternative trigger addresses are initially set to "0." This is because only one trigger address of a prefetch candidate may be active at any given time. To initialize the stride information, the last offset field 420c is set to "0," and the offset stable field 425c is set to "0."

Figure 10:
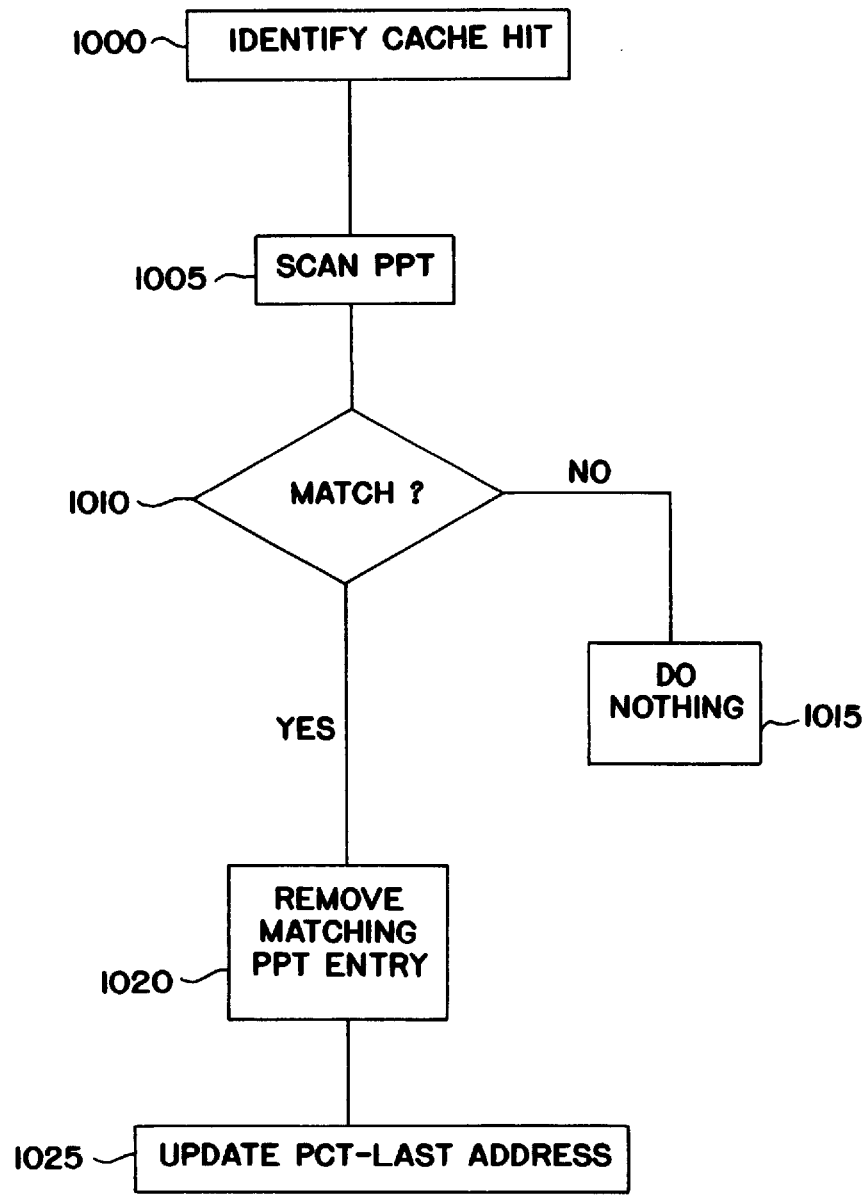
FIG. 10 is a flowchart diagram illustrating the processing of a cache hit according to an exemplary embodiment of the present invention.

Referring to FIG. 10, at step 1000, a cache hit is identified. Specifically, as shown in FIG. 8, the data cache 830 signals the hoist control 815 when the cache hit occurs. The program counter value of the instruction that caused the cache hit is transmitted to the hoist control 815. To determine whether a prefetch was executed, at step 1005, the hoist control 815 uses the memory address of the requested data to scan the PPT 810 for a corresponding pending prefetch. At step 1010, if a match was found in the PPT 810, the corresponding pending prefetch is removed from the PPT 810 in step 1020. This prevents the corresponding pending prefetch from ordinarily shifting out of the PPT 810.

If stride information is being maintained, the prefetch candidate corresponding to the cache hit is desirably updated, as indicated at step 1025 of FIG. 10. In particular, a new value for the last offset field 415b, illustrated in FIG. 4b, is computed using the difference between the memory address of the data requested when the cache hit occurred and the last address field 410b. If the new value for the last offset field 415b matches the old value, then the offset stable field 420b is set to "1." Otherwise, offset stable 420b is set to "0."

At step 1010, if no prefetch was executed, i.e. there was no match between the memory address of the data requested when the cache hit occurred and any pending prefetches in PPT 810, no further adjustments need be made, as indicated at step 1015.

Figure 11A:
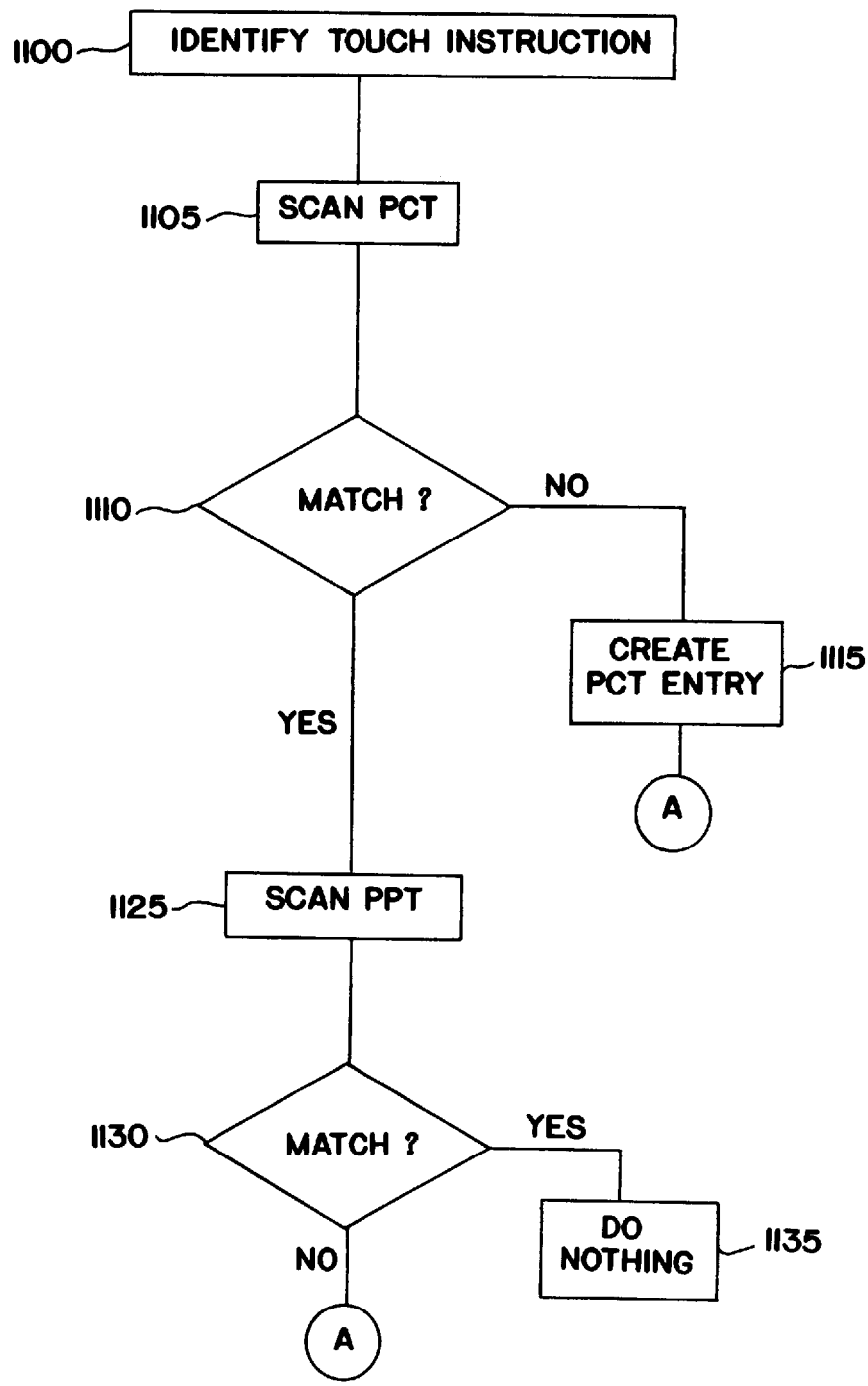
FIG. 11A and FIG. 11B are flowchart diagrams illustrating the processing of a touch instruction according to an exemplary embodiment of the present invention.
Figure 11B:
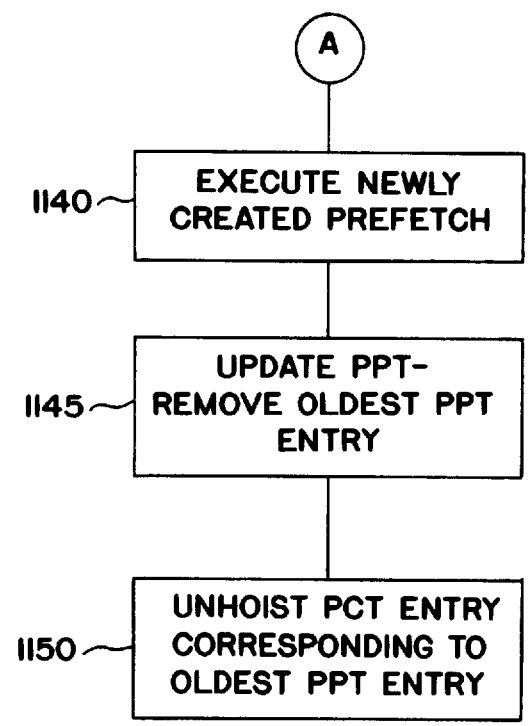

The behavior of an exemplary embodiment of the present invention in response to a touch instruction is illustrated in FIGS. 11A and 11B. At step 1100, the touch instruction is identified and communicated to the PCT 805. To determine whether the data requested by the touch instruction has previously been prefetched, the PCT 805 is desirably scanned, as illustrated at step 1105, using the program counter value corresponding to the touch instruction. At step 1110, the prefetch unit determines whether a prefetch candidate having a valid primary trigger address matches the program counter value, regardless of whether that address is active or inactive.

If there is no match at step 1110, a new prefetch candidate must be created in the PCT 805, as illustrated at step 1115. Regardless of whether stride information is being kept, and/or whether alternative trigger addresses are included in a prefetch candidate, the first step in creating a new prefetch candidate is to remove the least-recently-used prefetch candidate (according to an LRU algorithm which is known in the art) from the PCT 805 in order to make room for the new entry.

The remaining steps of creating a new prefetch candidate depend on whether the prefetch candidates include alternative trigger addresses, and whether stride information is being kept in the PCT 805.

If no stride information or alternative trigger addresses are used, referring back to FIG. 4a, creating a new prefetch candidate involves using the program counter value corresponding to the touch instruction as the primary trigger address 400a of the newly created prefetch candidate. The valid bit 405a is set to "1," and the last address field 410a is set to the memory address of the data requested when the touch instruction occurred.

If stride information is maintained in the PCT 805, referring now to FIG. 4b, creating a new prefetch candidate in the PCT 805 is accomplished using the program counter value corresponding to the touch instruction as the primary trigger address 400b of the newly created prefetch candidate. The valid bit 405b is set to "1," and the last address field 410b is set to the memory address of the data requested by the touch instruction. To update the stride information, the last offset field 415b is set to "0," and the offset stable field 420b is set to "0."

When stride information is maintained, and the prefetch candidates are provided with alternative trigger addresses, as illustrated by the extended prefetch candidate in FIG. 4c, creating a new prefetch candidate in the PCT 805 involves using the program counter value corresponding to the touch instruction as the primary trigger address 400c of the newly created prefetch candidate. The valid bit 405c for the primary trigger address is set to "1," and the active bit 410c for the primary trigger address is set to "0." The last address field 415c is set to the memory address of the data requested by the touch instruction. To obtain alternative trigger addresses, as shown in FIG. 8, the PCT 805 requests target addresses of executed program branches from the JHT 835. The target address corresponding to the most recently executed program branch maintained in the JHT 835 becomes the first alternative trigger address 430c. Similarly, the target address corresponding to the second most recently executed program branch maintained in the JHT 835 becomes the second alternative trigger address 445c, etc. The valid bits 435c, 450c for all of the alternative trigger addresses are set to "1." The active bit 440c for the first alternative trigger address 430c is set to "1," while the active fields 440c, 455c for the remaining plurality of alternative trigger addresses are maintained as "0." This is because only one trigger address of a prefetch candidate may be active at any given time. To update the stride information, the last offset field 420c is set to "0," and the offset stable field 425c is set to "0."

After a new prefetch candidate is created, the newly created prefetch candidate is executed at step 1140. At step 1145, the PPT 810 is automatically updated in response to the executed prefetch from step 1140. Specifically, the memory address of the data requested by the touch instruction is shifted into the PPT 810 as a prefetch address 710, and a trigger index 705 is created to correspond to the prefetch candidate created from step 1115. The oldest pending prefetch is shifted out of the PPT 810 into the oldest PPT entry 825.

Next, at step 1150, the prefetch candidate in the PCT 805 corresponding to the oldest PPT entry 825 is unhoisted. Specifically, after the oldest pending prefetch is shifted out of the PPT 810 into the oldest entry 825 at step 1145, the oldest entry 825 communicates the trigger index of the oldest pending prefetch to the unhoist control 820. The unhoist control 820 then uses the trigger index to identify the corresponding prefetch candidate in the prefetch candidate table 805.

Once the prefetch candidate is located by the unhoist control 820, the candidate is scanned in order to determine which one of the plurality of trigger addresses included therein is active. Referring now to FIG. 4c, if the first alternative trigger address 430c is active, i.e. field 440c is set to "1," then the primary trigger address 400c is made active. If one of the other alternative trigger addresses is active, then the previous alternative trigger address is made active. On the other hand, if the primary trigger address 400c is already active, then the prefetch candidate cannot be unhoisted. This is because the primary trigger address corresponds to the original trigger address for the prefetch candidate, and there are no other trigger addresses within the prefetch candidate which precede the primary trigger address 400c. To compensate for this dilemma, according to one aspect of the present invention, all of the active fields in the prefetch candidate are set to "0." According to another aspect of the present invention, the active bit 410c associated with the primary trigger address 400c is left as a "1."

Returning to step 1110, if a prefetch candidate having a valid primary trigger address is found which matches the program counter value of the touch instruction, the PPT 810 is scanned, at step 1125, for a pending prefetch having a prefetch address which matches the memory address of the data requested by the touch instruction. If there is a match, as illustrated at step 1130, the match indicates that a prefetch was executed, so no updates are required, as illustrated at step 1135. In an alternative embodiment of the present invention, the stride or confirmation information is updated. On the other hand, no match in the PPT 810 indicates that no prefetch is pending for the memory address of the data requested by the touch instruction. Therefore, at step 1140, a new pending prefetch is desirably created in the PPT 810 by executing the prefetch candidate created at step 1115.

At step 1145, the PPT 810 is automatically updated in response to the executed prefetch from step 1140. Specifically, the memory address of the data requested by the touch instruction is shifted into the PPT 810 as a prefetch address 710, and a trigger index 705 is created to correspond to the prefetch candidate created from step 1115. The oldest pending prefetch is shifted out of the PPT 810 into the oldest PPT entry 825.

Next, at step 1150, the prefetch candidate in the PCT 805 corresponding to the oldest PPT entry 825 is unhoisted. Specifically, after the oldest pending prefetch is shifted out of the PPT 810 into the oldest entry 825 at step 1145, the oldest entry 825 communicates the trigger index of the oldest pending prefetch to the unhoist control 820. The unhoist control 820 then uses the trigger index to identify the corresponding prefetch candidate in the prefetch candidate table 805.

Once the prefetch candidate is located by the unhoist control 820, the candidate is scanned in order to determine which one of the plurality of trigger addresses included therein is active. Referring now to FIG. 4c, if the first alternative trigger address 430c is active, i.e. field 440c is set to "1," then the primary trigger address 400c is made active. If one of the other alternative trigger addresses is active, then the previous alternative trigger address is made active. On the other hand, if the primary trigger address 400c is already active, then the prefetch candidate cannot be unhoisted. This is because the primary trigger address corresponds to the original trigger address for the prefetch candidate, and there are no other trigger addresses within the prefetch candidate which precede the primary trigger address 400c. To compensate for this dilemma, according to one aspect of the present invention, all of the active fields in the prefetch candidate are set to "0." According to another aspect of the present invention, the active bit 410c associated with the primary trigger address 400c is left as a "1."

Figure 12:
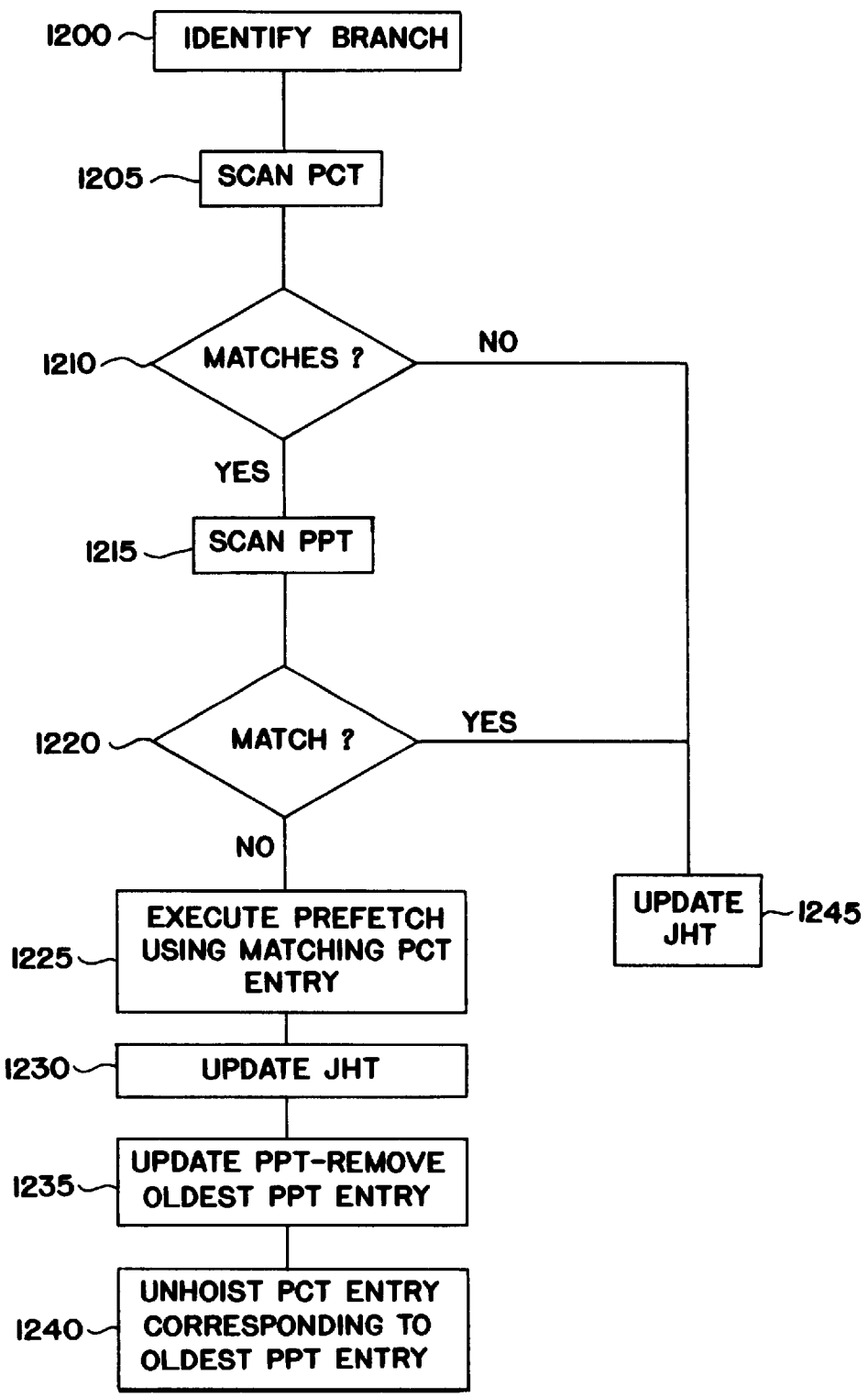
FIG. 12 is a flowchart diagram illustrating the processing of a program branch according to an exemplary embodiment of the present invention.

The actions of the prefetch unit according to an exemplary embodiment of the present invention with respect to a program branch are now described. Referring briefly back to FIG. 2, the branch unit 225 receives a program branch instruction from the decode and dispatch unit 220. The program branch is communicated to the prefetch unit 250 by the branch unit 225, and the prefetch unit 250 identifies it as such at step 1200 in FIG. 12. Once the program branch is identified at step 1200, the target address of the program branch is used to scan the PCT 805, as shown at step 1205, for matching prefetch candidates. At step 1205, there are two ways of comparing the target address to prefetch candidates. According to one exemplary method, the PCT 805 is scanned for a prefetch candidate having a trigger address that is both valid and active which is identical to the target address, i.e. if all bits of the trigger address match the target address. According to a second exemplary method of the present invention, one or more of the bits of the target address could be ignored when the PCT 805 is scanned 1205 for a corresponding trigger address.

At step 1210, for each match that occurs between a prefetch candidate and the target address of the program branch, the memory address of the data to be prefetched is desirably computed. Returning to FIG. 4a, for a prefetch candidate in which no stride information is kept, this is simply the last address field 410a. If, on the other hand, stride information is maintained, as illustrated in FIG. 4b, the memory address of the data to be prefetched is computed using the last offset field 415b and offset stable field 420b. Specifically, if offset stable 420b is a "1," then the last offset 415b is added to the last address 410b to determine the memory address. If, however, offset stable is not a "1," depending on the particular embodiment of the present invention, the prefetch unit can decide whether or not to request value of last address 410b.

After a memory address is computed, the PPT 810 is scanned, at step 1215, to determine whether data at the specified memory address has been prefetched recently. This determination may be made by comparing the memory address to the prefetch addresses 710 of the pending prefetches maintained in the PPT 810. If, at step 1220, no match is made in the PPT 810 between the memory address and one of the plurality of prefetch addresses 710, and there is no pending cache miss for the same cache line, a prefetch is executed at step 1225 using the memory address computed from the matching prefetch candidate from step 1210.

After a prefetch is executed in step 1225, after no match is found in the PCT 805 at step 1210, or after a match was found at step 1220, the JHT 835 is updated. Specifically, the program counter value for the next executed instruction after the program branch, which corresponds to the target address of the program branch, is stored as one of the plurality of target addresses in the JHT 835. To avoid adjacent duplicate entries in the JHT 835, if the program counter value for the next executed instruction of the program branch matches the most recent entry in the JHT 835, then the JHT 835 is not modified. In an alternative embodiment, target addresses of program branches are inserted into the JHT 835 only if they do not match current JHT 835 entries.

Lastly, after a prefetch was executed at step 1225, and the JHT 835 was updated at step 1235, the PPT 810 is updated in order to unhoist the oldest pending prefetch. Specifically, after a prefetch is executed at step 1225, the PPT 810 is automatically updated 1235 to store the memory address of the data requested by the executed prefetch request as a prefetch address of one of the pending prefetches. The PPT 810 also receives the index of the PCT entry from which the prefetch was derived. This index is received in trigger index 705. Of course, referring to FIG. 8, the prefetch candidate in the PCT 805 corresponding to the oldest PPT entry 825 is unhoisted. Specifically, after the oldest pending prefetch is shifted out of the PPT 810 into the oldest entry 825 at step 1145, the oldest entry 825 communicates the trigger index of the oldest pending prefetch to the unhoist control 820. The unhoist control 820 then uses the trigger index to identify the corresponding prefetch candidate in the prefetch candidate table 805.

Once the prefetch candidate is located by the unhoist control 820, the candidate is scanned in order to determine which of the plurality of trigger addresses included therein is active. Referring now to FIG. 4c, if the first alternative trigger address 430c is active, i.e. field 440c is set to "1," then the primary trigger address 400c is made active. If one of the other alternative trigger addresses is active, then the previous alternative trigger address is made active. On the other hand, if the primary trigger address 400c is already active, then the prefetch candidate cannot be unhoisted. This is because the primary trigger address corresponds to the original trigger address for the prefetch candidate, and there are no other trigger addresses within the prefetch candidate which precede the primary trigger address 400c. To compensate for this dilemma, according to one aspect of the present invention, all of the active fields in the prefetch candidate are set to "0." According to another aspect of the present invention, the active bit 410c associated with the primary trigger address 400c could just be left as a "1."

According to one exemplary embodiment of the present invention, the identification of a basic block is maintained in the JHT 835 while the basic block is being executed. This identification could be caused by loops in the control flow graph of the original program.

According to another exemplary embodiment of the present invention, a prefetch candidate is desirably not hoisted into the basic block from which it originated unless stride information is maintained, in which case the base address of the stride mechanism should be advanced by one stride value. That is, if a prefetch candidate requests data at memory address X with a stride of S, then the stride information is modified so that data at memory address X+S with a stride of S is requested the next time the prefetch is issued. If stride information is not used, then a prefetch candidate is desirably prevented from being hoisted when its primary trigger address matches the program counter value corresponding to the location in the program to which the prefetch candidate is to be hoisted.

According to another exemplary embodiment of the present invention, when inserting alternative trigger locations in a prefetch candidate within PCT 805, any alternative trigger locations that match the primary trigger location are withheld from being inserted into PCT 805.

According to another exemplary embodiment of the present invention, when stride is not being maintained, and there are no alternative trigger addresses in the prefetch candidates in the PCT 805, the most recent target address stored in the JHT 835 may be inserted as the primary trigger address of a prefetch candidate when the prefetch candidate is created. This provides for simple static hoisting of a prefetch request. When the PCT 805 is scanned for prefetch candidates in response to cache misses or touch instructions in a basic block, matching primary trigger addresses are not found unless the touch instruction or instruction causing the cache miss is also the first instruction of the block. In addition, there are multiple prefetch candidates having the same primary trigger address. The LRU replacement algorithm ordering is used to determine which prefetch candidate to update when there are multiple prefetch candidates having the same matching primary trigger address. Specifically, the oldest (least recently used) matching prefetch candidate is updated. This allows for a single static hoist for multiple prefetch candidates to the top of a basic block that includes the touch instruction or instruction that caused the cache miss.

Alternative prefetch trigger addresses can be installed when a prefetch candidate is created. According to another exemplary embodiment of the present invention, each alternative prefetch trigger address is installed one at a time, using the most recent target address in the JHT 835 every time a prefetch is executed. That is, every time a prefetch candidate is executed as a prefetch request, a new alternative address field is created the prefetch candidate using the most recent target address from the JHT 835. This is because the most recent JHT 835 entry desirably indicates a useful location for the newest alternative trigger address. According to this exemplary embodiment, in which alternative trigger addresses are dynamically observed, additional advantages may be provided. For example, dynamic observations may be more appropriate due to temporal considerations.

According to another exemplary embodiment of the present invention, a primary trigger address and a plurality of alternative trigger addresses may be installed when a prefetch candidate is created, and any of these trigger addresses may be dynamically updated one at a time, using the most recent target address in the JHT 835 every time a prefetch is executed.

According to another exemplary embodiment of the present invention, a primary trigger address and one or more alternative trigger addresses may share bits of their effective and virtual addresses. When these bits are the same, they are desirably stored once in the PCT 805. By factoring the common bits, this enables implementations with a larger number of alternative trigger addresses at a reduced per-bit-cost per trigger location.

According to another exemplary embodiment of the present invention, additional software control is provided. In particular, the compiler may instruct the prefetch unit to "nap" and "wakeup" so that the compiler can do the prefetching. The compiler may instruct the prefetch unit in this manner by inserting instructions, for example, to modify processor state registers. This exemplary embodiment is particularly useful for dense, scientific inner loops, where compilers have traditionally done well.

In the embodiments described above, an LRU algorithm has been described for purposes of updating tables. It is understood to one of ordinary skill in the art that other types of replacement algorithms may also be used in either hardware or software.

In another exemplary embodiment of the present invention, various mechanisms may be used to confirm the desirability of a prefetch at a particular location. This may be accomplished, for example, as described in U.S. Pat. No. 4,807,110 by Pomerene et al., which is hereby incorporated by reference.

Furthermore, stride may be deduced in a data reference pattern in a manner related to more traditional hardware-based stride prefetchers. Stride prefetching is further described in J. Fu, J. Patel, and B. Janssens, "Stride Directed Prefetching in Scalar Processors," SIGMICRO Newsletter, Vol. 23, p. 102–110, 1992, which is incorporated herein by reference.

As a result of the method and apparatus disclosed above, a prefetch trigger address may be dynamically adjusted as a program is executed rather than being limited to a fixed program counter value. Furthermore, a prefetch trigger address may be dynamically adjusted so that if an executing program repeats a local code fragment, then the prefetch will be issued earlier. In addition, a prefetch trigger address may be adjusted many times, and across many program regions. After a prefetch trigger address has been adjusted so that it is issued earlier, the prefetch trigger address may be dynamically adjusted so that it is closer to its original location.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. Apparatus for requesting prefetching from a cache during program execution, comprising:

identification means for identifying an operation which uses said cache, prefetch candidate means for storing a trigger address associated with said program at which a request for prefetching from said cache is executed for said operation, and hoist means for changing said trigger address to a further trigger address associated with said program at which said request for prefetching from said cache is executed for said operation.

2. An apparatus according to claim 1, wherein said operation is one of a program branch, a cache access, and a touch instruction which instructs an execution unit in said data processing system to perform said prefetch request.

3. An apparatus according to claim 1 further comprising jump history means for maintaining a jump history table which includes at least one target address of a previously executed program branch, wherein said at least one trigger address in the prefetch candidate means is obtained from said at least one target address.

4. An apparatus according to claim 3, wherein said at least one trigger address in the prefetch candidate means is obtained from said at least one target address upon execution of the prefetch request.

5. An apparatus according to claim 1, said apparatus further comprising pending prefetch means for maintaining a pending prefetch table which includes at least one pending prefetch, said at least one pending prefetch being stored in the pending prefetch table responsive to execution of the prefetch request.

6. An apparatus according to claim 5 wherein said at least one trigger address is one of a plurality of trigger addresses, said apparatus further comprising scanning means for scanning said pending prefetch table and locating said pending prefetch in said pending prefetch table.

7. An apparatus according to claim 6, wherein said scanning means signals said selection means to select another of said plurality of trigger addresses as said active trigger address responsive to said scanning means locating said pending prefetch in said pending prefetch table.

8. An apparatus according to claim 6, wherein at least one of said plurality of trigger addresses is created responsive to said scanning means not locating said pending prefetch in said pending prefetch table.

9. An apparatus according to claim 6 further comprising removal means for removing said pending prefetch responsive to said scanning means locating said pending prefetch in said pending prefetch table.

10. An apparatus according to claim 1 wherein said at least one trigger address is one of a plurality of trigger addresses, said apparatus further comprising scanning means for scanning said plurality of trigger addresses and locating said at least one trigger address.

11. An apparatus according to claim 10, wherein at least one of said plurality of trigger addresses is created responsive to said scanning means not locating said at least one trigger address in said plurality of trigger addresses.

12. An apparatus according to claim 10, said apparatus farther comprising:

pending prefetch means for maintaining a pending prefetch table which includes at least one pending prefetch, said at least one pending prefetch being stored in the pending prefetch table responsive to execution of the prefetch request, and pending prefetch scanning means for scanning said pending prefetch table and locating said pending prefetch in said pending prefetch table responsive to said scanning means locating said at least one trigger address in said plurality of trigger addresses.

13. An apparatus according to claim 1 wherein said at least one trigger address is one of a plurality of trigger addresses, said at least one trigger address being stored by the prefetch candidate means only if another one of the plurality of trigger addresses does not correspond to said at least one trigger address.

14. An apparatus according to claim 1 wherein said at least one trigger address is one of a plurality of trigger addresses, said at least one trigger address being stored by the prefetch candidate means only if a predetermined number of bits of another one of the plurality of trigger addresses does not correspond to said at least one trigger address.

15. An apparatus according to claim 1 wherein said at least one trigger address is one of a plurality of trigger addresses, said at least one trigger address being stored by the prefetch candidate means only if another one of the plurality of trigger addresses does not correspond to a predetermined number of bits of said at least one trigger address.

16. An apparatus according to claim 1 further comprising a compiler, wherein said compiler selectively enables execution of said prefetch request.

17. In a data processing system having a cache, a method for adjusting the timing of a prefetch request to said cache during program execution, comprising the steps of:

storing a trigger address associated with said program at which a request for prefetching from said cache is executed for an operation which uses said cache, identifying said operation, and changing said trigger address to a further trigger address associated with said program at which said request for prefetching from said cache is executed for said operation.

18. A method according to claim 17, wherein said operation is one of a program branch, a cache request, and a touch instruction which instructs an execution unit in said data processing system to perform said prefetch request.

19. A method of adjusting the timing of a prefetch request according to claim 17 further comprising the steps of:

maintaining a pending prefetch table which includes at least one pending prefetch, and storing the pending prefetch in the pending prefetch table responsive to identification of the executed operation.

20. In a data processing system having a processor and a cache, a method for adjusting the timing of a prefetch request to said cache during program execution, comprising the steps of:

storing a memory address as at least one pending prefetch in a pending prefetch table, storing a trigger address associated with the program corresponding to a potential prefetch request in a prefetch candidate table, identifying a cache miss, determining whether said pending prefetch in the pending prefetch table corresponds to said cache miss, and selecting said trigger address from the prefetch candidate table as an active trigger address at which said prefetch request is to be executed responsive to locating said pending prefetch in said pending prefetch table;

identifying said cache miss again; and changing said trigger address to a further trigger address associated with said program.

21. A method according to claim 20 further comprising the step of creating a new trigger address in the prefetch candidate table if there is no correspondence between the cache miss and said pending prefetch, the cache miss defining said new trigger address.

22. In a data processing system having a cache, a method for adjusting the timing of a prefetch request to said cache comprising the steps of:

storing a memory address as at least one pending prefetch in a pending prefetch table, storing at least one trigger address corresponding to a potential prefetch request in a prefetch candidate table, identifying a touch instruction which causes said prefetch request, determining whether said trigger address in said prefetch candidate table corresponds to said touch instruction, and creating a new trigger address in the prefetch candidate table to adjust the timing of said prefetch request if there is no correspondence between the touch instruction and said trigger address, the touch instruction defining said new trigger address.

23. A method according to claim 22 further comprising the steps of:

determining whether there is correspondence in the pending prefetch table between the touch instruction and said pending prefetch if there was correspondence in the prefetch candidate table, and executing the newly created trigger address as said prefetch request if there is correspondence in the pending prefetch table.

24. In a data processing system having a cache, a method for adjusting the timing of a prefetch request to said cache comprising the steps of:

storing a memory address as at least one pending prefetch in a pending prefetch table, storing at least one trigger address corresponding to a potential prefetch request in a prefetch candidate table, identifying a program branch having a target address, determining whether there is a match in the prefetch candidate table between the target address of the identified program branch and said trigger address, and storing the target address of the identified program branch as one of a plurality of target addresses of program branches which have been executed for use in adjusting the timing of said prefetch request.

25. A method according to claim 24 further including the steps of:

storing at least one data memory address with said at least one trigger address in the prefetch candidate table determining, if there is a match in the prefetch candidate table, whether there is a match in the pending prefetch table between the corresponding data memory address and said pending prefetch.

26. A method according to claim 24 wherein the identified program branch corresponds to a basic block, the basic block thereby being tracked by storing the target address of the identified program branch as one of the plurality of target addresses while the basic block is being executed.

27. A method according to claim 25 further including the step of executing the prefetch request to said data memory address if there is no match in the pending prefetch table.

* * * * *

UNITED STATES PATENT AND TRADE MARK OFFICE
CERTIFICATE OF CORRECTION

PATENT NO. : 5,809,566
DATED : September 15, 1998
INVENTOR(S) : Charney et al.

It is certified that error appears in the above-identified patent and that said Letters Patent is hereby corrected as shown below:

On the Cover Page, Field [75], "Thomas Robert Puzak" should read -- Thomas Roberts Puzak --.

At column 4, line 25, "FIG. 4a, FIG. 4b and FIG. 4c" should read -- FIG. 4A, FIG. 4B and FIG. 4C --.

At column 5, line 66, "4a and 4b" should read -- 4A and 4B --.

At column 6, line 1, "4a" should read -- 4A --.

At column 6, line 8, "4a" should read -- 4A --.

At column 6, line 14, "4b" should read -- 4B --.

At column 6, line 17, "4a" should read -- 4A --.

At column 6, line 30, "4a" should read --4A --.

At column 6, line 39, "4c" should read -- 4C --.

UNITED STATES PATENT AND TRADE MARK OFFICE
CERTIFICATE OF CORRECTION

PATENT NO. : 5,809,566
DATED : September 15, 1998
INVENTOR(S) : Charney et al.

It is certified that error appears in the above-identified patent and that said Letters Patent is hereby corrected as shown below:

At column 6, line 41, "FIGS. 4a and 4b" should read -- FIGS. 4A and 4B --.

At column 6, line 44, "4c" should read -- 4C --.

At column 6, line 63, "4b" should read -- 4B --.

At column 6, line 67, "4c" should read -- 4C --.

At column 10, line 9, "4a" should read -- 4A --.

At column 10, line 17, "4b" should read -- 4B --.

At column 10, line 28, "4c" should read -- 4C --.

At column 11, line 5, "4b" should read -- 4B --.

At column 11, line 42, "4a" should read -- 4A --.

At column 11, line 51, "4b" should read -- 4B --.

UNITED STATES PATENT AND TRADE MARK OFFICE
CERTIFICATE OF CORRECTION

PATENT NO. : 5,809,566
DATED : September 15, 1998
INVENTOR(S) : Charney et al.

It is certified that error appears in the above-identified patent and that said Letters Patent is hereby corrected as shown below:

At column 11, line 62, "4c" should read -- 4C --.

At column 12, line 43, "4c" should read -- 4C --.

At column 13, line 27, "4c" should read -- 4C --.

At column 13, line 67, "4a" should read -- 4A --.

At column 14, line 3, "4b" should read -- 4B --.

At column 14, line 57, "4c" should read -- 4C --.

At column 17, claim 12, line 2, "farther" should read -- further --.

Signed and Sealed this

Ninth Day of February, 1999

Attest:

Attesting Officer

*Acting Commissioner of Patents and Trademarks*